(12) United States Patent
Udagawa et al.

(10) Patent No.: US 8,585,156 B2
(45) Date of Patent: Nov. 19, 2013

(54) TRAVEL CONTROL DEVICE FOR WORK VEHICLE AND WORK VEHICLE

(75) Inventors: Tsutomu Udagawa, Tsukuba (JP); Eiji Egawa, Tsuchiura (JP); Tsukasa Toyooka, Omitama (JP); Makoto Sugaya, Narita (JP); Hideo Sorata, Kasumigaura (JP); Tsuyoshi Nakamura, Tsuchiura (JP); Akira Nakayama, Tsuchiura (JP); Kazuo Takiguchi, Kasumigaura (JP); Kensuke Satou, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1355 days.

(21) Appl. No.: 12/092,370

(22) PCT Filed: Nov. 1, 2006

(86) PCT No.: PCT/JP2006/321837
§ 371 (c)(1),
(2), (4) Date: May 1, 2008

(87) PCT Pub. No.: WO2007/052692
PCT Pub. Date: May 10, 2007

(65) Prior Publication Data
US 2009/0127928 A1 May 21, 2009

(30) Foreign Application Priority Data
Nov. 2, 2005 (JP) .................................. 2005-319362

(51) Int. Cl.
*F16H 61/42* (2010.01)

(52) U.S. Cl.
USPC .... 303/113.2; 303/10; 303/113.1; 303/116.2; 303/116.3; 303/900; 60/450; 60/451; 60/460; 180/197; 180/242; 180/307; 477/37; 477/52; 701/50; 701/51; 701/53; 701/74

(58) Field of Classification Search
USPC ......... 303/10, 113.2; 180/197, 242, 305, 307; 477/52
See application file for complete search history.

(56) References Cited

U.S. PATENT DOCUMENTS 4,399,886 A * 8/1983 Pollman ........................ 180/197
4,976,332 A * 12/1990 Hein ............................. 180/197

(Continued)

FOREIGN PATENT DOCUMENTS

EP    0 494 517 A2    7/1992
EP    1 582 389 A2    10/2006

(Continued)

OTHER PUBLICATIONS

European Search Report dated Sep. 14, 2009 (six (6) pages).

(Continued)

*Primary Examiner* — Robert A Siconolfi
*Assistant Examiner* — San Aung
(74) *Attorney, Agent, or Firm* — Crowell & Moring LLP

(57) ABSTRACT

A travel control device for a work vehicle includes: a hydraulic pump; a plurality of hydraulic motors connected to the hydraulic pump in parallel through a closed-circuit connection, that drive different wheels with pressure oil delivered from the hydraulic pump; a slip detection device that detects a slip occurring at each of the wheels; and a flow control device that reduces, upon detection of a slip occurring at any of the wheels by the slip detection device, a quantity of pressure oil supplied to a hydraulic motor for driving the wheel at which the slip has been detected, among the plurality of hydraulic motors.

7 Claims, 11 Drawing Sheets

(56) References Cited

U.S. PATENT DOCUMENTS

| | | | |
|---|---|---|---|
| 5,065,577 A * | 11/1991 | Markunas | 60/450 |
| 6,206,131 B1 | 3/2001 | Lauck | |
| 6,408,972 B1 | 6/2002 | Rodgers et al. | |
| 7,201,245 B2 * | 4/2007 | Shrive et al. | 180/197 |
| 2004/0211614 A1 * | 10/2004 | Matsuyama | 180/305 |
| 2006/0243510 A1 * | 11/2006 | Ho et al. | 180/242 |
| 2007/0187207 A1 | 8/2007 | Hofer | |

FOREIGN PATENT DOCUMENTS

| | | |
|---|---|---|
| GB | 2 089 006 A | 6/1982 |
| JP | 3-144167 A | 6/1991 |
| JP | 4-102762 A | 4/1992 |
| JP | 5-8121 U | 2/1993 |
| JP | 5-308768 A | 11/1993 |
| JP | 11-166623 A | 6/1999 |
| JP | 11-230333 A | 8/1999 |
| JP | 2000-1127 A | 1/2000 |
| JP | 2002-206637 A | 7/2002 |
| JP | 2004-144264 A | 5/2004 |
| JP | 2005-72891 A | 3/2005 |

OTHER PUBLICATIONS

European Search Report dated Oct. 15, 2009 with English translation (six (6) pages).
Japanese Office Action dated Mar. 15, 2011 with English Translation (six (6) pages).
European Office Action dated Sep. 5, 2012 (Five (5) sheets).
International Search Report dated Dec. 19, 2006 (two(2) pages).

* cited by examiner

FIG.5
(a)
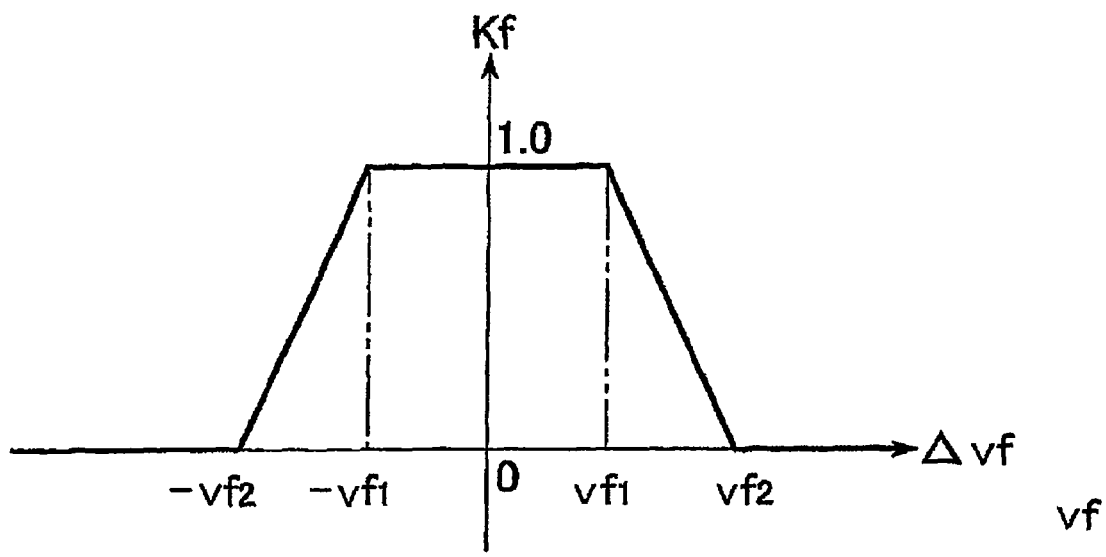
(b)
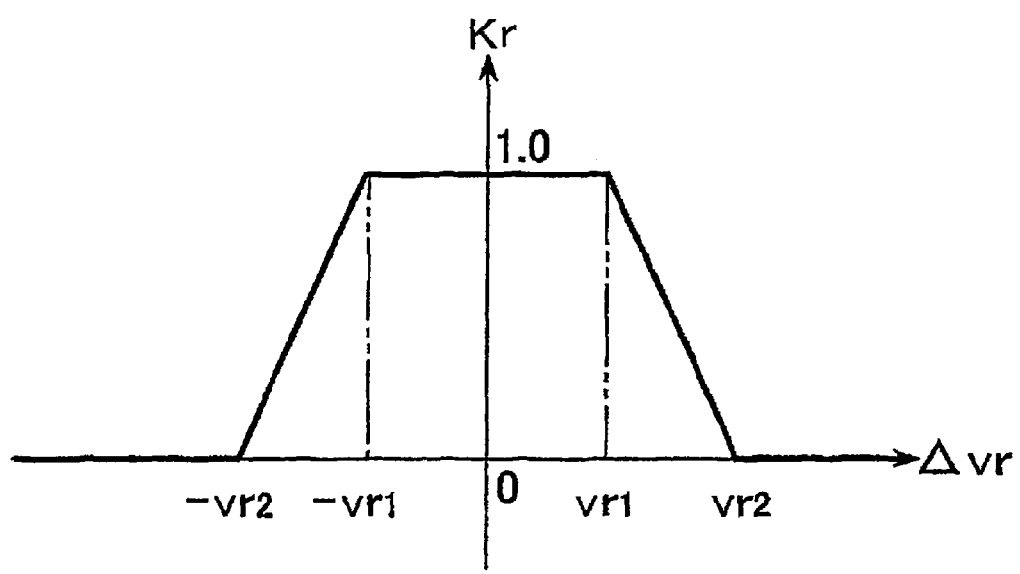

TRAVEL CONTROL DEVICE FOR WORK VEHICLE AND WORK VEHICLE

TECHNICAL FIELD

The present invention relates to a travel control device for a work vehicle such as a telescopic handler and a work vehicle.

BACKGROUND ART

The work vehicles proposed for applications in the related field include work vehicles equipped with an HST traveling hydraulic circuit with a hydraulic pump and a traveling hydraulic motor connected therein through a closed circuit connection (see patent reference literature 1). In the work vehicle disclosed in patent reference literature 1, two traveling hydraulic motors, disposed parallel to each other, are connected to a single hydraulic pump through a closed circuit connection and each hydraulic motor is connected to the front wheels or the rear wheels so as to drive the front wheels and the rear wheels with different hydraulic motors. A variable relief valve is connected to the hydraulic motor for driving the front wheels and the drive torque at the front wheels is controlled by adjusting the relief pressure setting.

DISCLOSURE OF THE INVENTION

Problems to be Solved by the Invention

There is an issue yet to be effectively addressed in the work vehicle disclosed in patent reference literature 1 in that if either a front wheel or a rear wheel slips, the pressure oil from the hydraulic pump cannot be efficiently distributed to the individual hydraulic motors, resulting in a significant loss of power.

Means for Solving the Problems

A travel control device for a work vehicle according to a first aspect includes: a hydraulic pump; a plurality of hydraulic motors connected to the hydraulic pump in parallel through a closed-circuit connection, that drive different wheels with pressure oil delivered from the hydraulic pump; a slip detection device that detects a slip occurring at each of the wheels; and a flow control device that reduces, upon detection of a slip occurring at any of the wheels by the slip detection device, a quantity of pressure oil supplied to a hydraulic motor for driving the wheel at which the slip has been detected, among the plurality of hydraulic motors.

In the first aspect, it is preferable that the flow control device reduces the quantity of pressure oil supplied to the hydraulic motor by a greater extent as an extent of slippage detected by the slip detection device becomes larger.

In the first aspect, the flow control device may include a restoring device that gradually restores the quantity of pressure oil supplied to the hydraulic motor to a value before reduction as the slip detection device determines that a slip is eliminated after the quantity of pressure oil supplied to the hydraulic motor is reduced upon the detection of a slip by the slip detection device.

A travel control device for a work vehicle according to a second aspect includes: a hydraulic pump; a plurality of hydraulic motors connected to the hydraulic pump in parallel through a closed-circuit connection, that drive different wheels with pressure oil delivered from the hydraulic pump; a slip detection device that detects a slip occurring at each of the wheels; and a displacement reducing device that reduces, upon detection of a slip occurring at any of the wheels by the slip detection device, a motor displacement of a hydraulic motor for driving the wheel at which the slip has been detected, among the plurality of hydraulic motors.

In the second aspect, it is preferable that the displacement reducing device reduces the motor displacement of the hydraulic motor by a greater extent as an extent of slippage detected by the slip detection device becomes larger.

In second aspect, the displacement reducing device may include a restoring device that gradually restores the motor displacement of the hydraulic motor to a value before reduction as the slip detection device determines that a slip is eliminated after reducing the motor displacement of the hydraulic motor upon the detection of a slip by the slip detection device.

In the travel control device for a work vehicle according to the first or second aspect, the slip detection device may include a speed detection device that detects a rotational velocity at each of the wheels, may estimate a vehicle speed based upon the rotational velocities detected by the speed detection device and may detect a slip based upon deviations of the rotational velocities detected by the speed detection device relative to the estimated vehicle speed.

In the first aspect, it is preferable that the flow control device includes flow control valves each disposed in a pipeline between the hydraulic pump and one of the plurality of hydraulic motors and electromagnetic switching valves via which a pilot pressure is applied to the flow control valves.

In the first aspect, it is preferable that the flow control device includes flow control valves each disposed in a pipeline between the hydraulic pump and one of the plurality of hydraulic motors and electromagnetic switching valves via which a pilot pressure is be applied to the flow control valves; and the restoring device is constituted with slow return valves that slowly restores the pilot pressure applied to the flow control valves via the electromagnetic switching valves.

In the first aspect, the flow control device may include flow control valves each disposed in a pipeline between the hydraulic pump and one of the plurality of hydraulic motors and electromagnetic switching valves via which a pilot pressure is applied to the flow control valves; and the restoring device may be constituted with a delay processing circuit that executes delay processing on control signals provided to the electromagnetic switching valves.

In the second aspect, it is preferable that the restoring device is a delay processing circuit that executes delay processing on a control signal used to control the motor displacement of the hydraulic motor.

A work vehicle according to a fifth aspect of the present invention includes the drive control device for a work vehicle according to the first or second aspect.

Advantageous Effect of the Invention

According to the present invention, as a slip of a wheel is detected, the quantity of pressure oil delivered to the hydraulic motor driving the wheel detected to have slipped is reduced or the motor displacement of the hydraulic motor driving the slipping wheel is reduced. As a result, the extent of slippage can be minimized and the pressure oil from the hydraulic pump can be distributed to the hydraulic motors efficiently.

BRIEF DESCRIPTION OF THE DRAWINGS

FIGS. 5(a) and 5(b) show the characteristics of coefficient generating circuits in FIG. 4;

BEST MODE FOR CARRYING OUT THE INVENTION

-First Embodiment-

The following is an explanation of the first embodiment of a travel control device according to the present invention, given in reference to FIGS. 1 through 5.

Figure 1:
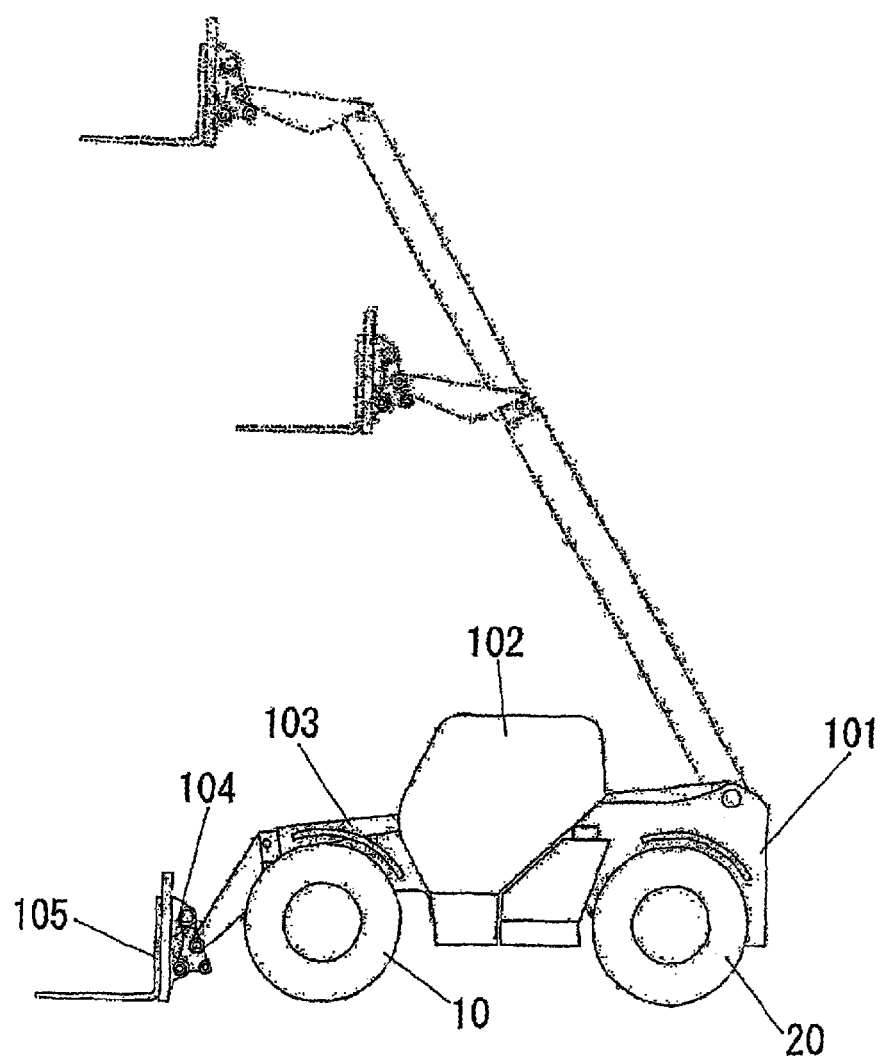
FIG. 1 is a side elevation of a telescopic handler that may adopt the present invention.
Figure 2:
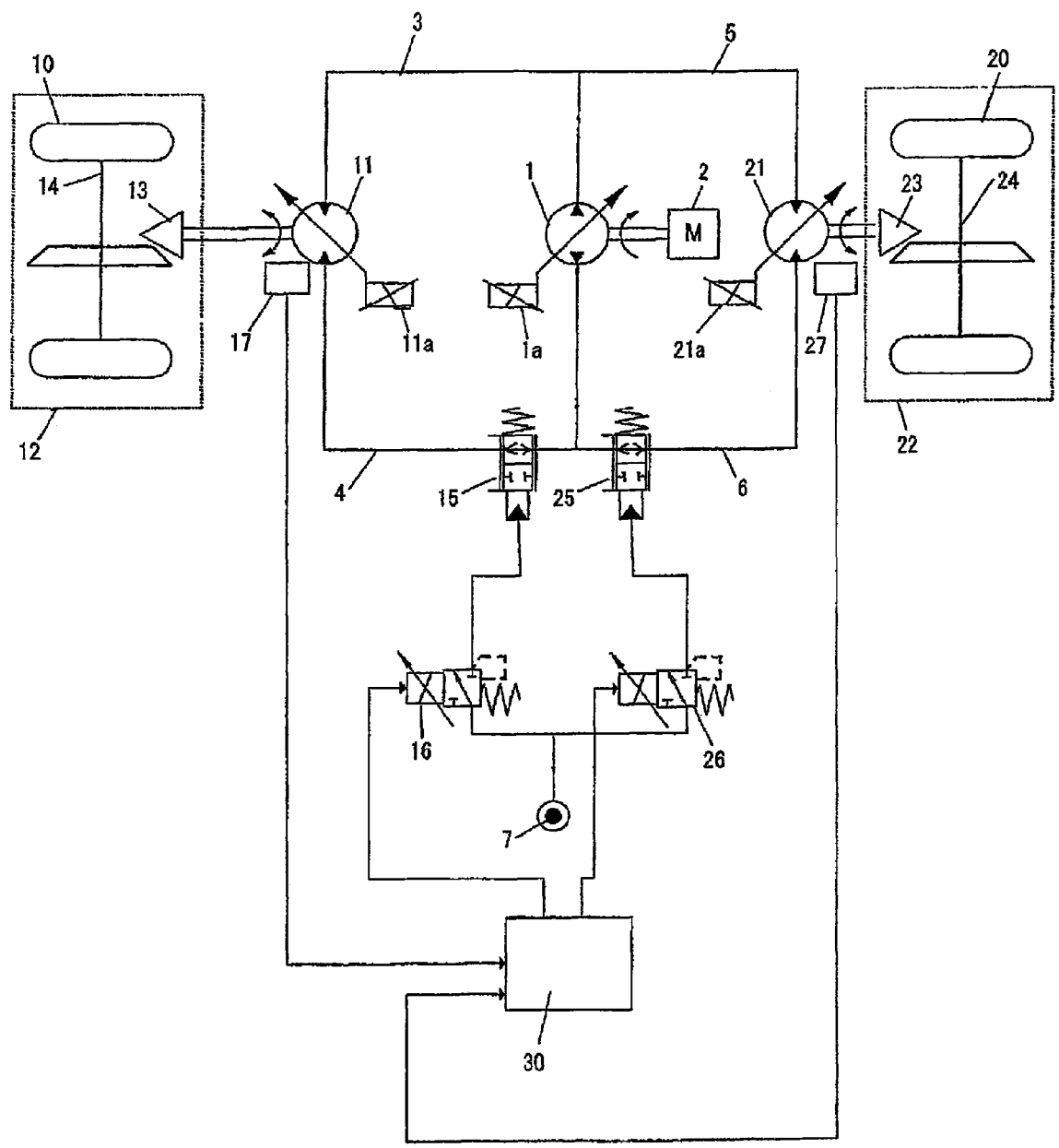
FIG. 2 is a traveling hydraulic circuit diagram illustrating the structure adopted in a travel control device achieved in a first embodiment.

FIG. 1 is a side elevation of a telescopic handler that may adopt the first embodiment of the present invention and FIG. 2 presents a circuit diagram of the traveling hydraulic circuit of the telescopic handler. As shown in FIG. 1, the telescopic handler includes a body 101, an operator's cab 102 disposed on the body 101 and an extensible boom 103 which is supported at the rear of the body in such a manner that it can be hoisted up and down. An attachment mount unit 104 is rotatably mounted at the front end of the boom 103 and a fork 105 used in a loading operation is attached to the attachment mount unit 104. It is to be noted that FIG. 1 shows the boom 103 in a lowered state (solid line) and the boom 103 in both a raised, extended state and a raised contracted state (two-point chain lines). Front wheels (front tires 10) and rear wheels (rear tires 20) are mounted at the body 101 and the vehicle travels as the tires 10 and 20 rotate.

As shown in FIG. 2, a traveling hydraulic circuit is an HST traveling circuit which includes a hydraulic motor 11 connected through a closed-circuit connection to a main hydraulic pump 1, which is driven by an engine 2, via pipelines 3 and 4 and a hydraulic motor 21 disposed in parallel to the hydraulic motor 11 and connected to the main hydraulic pump 1 through a closed-circuit connection via pipelines 5 and 6.

The hydraulic motors 11 and 21 are respectively linked to travel control devices 12 and 22. The travel control device 12 transmits a drive torque from the hydraulic motor 11 to an axle 14 via a speed reducer 13 to drive the front wheels. Likewise, the travel control device 22 transmits a drive torque from the hydraulic motor 21 to an axle 24 via a speed reducer 23 to drive the rear wheels. In other words, the front wheels and the rear wheels are driven by different hydraulic motors 11 and 21.

Flow control valves 15 and 25 are disposed in the pipelines 4 and 6 respectively, and a pilot pressure from a hydraulic source 7 is applied to the flow control valves 15 and 25 respectively via electromagnetic switching valves 16 and 26. The electromagnetic switching valves 16 and 26 are individually switched as detailed later by signals provided by controller 30 and as the flow control valves 15 and 25 are driven in response, the diameters of the pipelines 4 and 6 change.

The motor displacements of the hydraulic motors 11 and 21, each constituted with a variable-displacement motor, are respectively controlled by displacement control devices 11a and 21a. The rotational speeds (peripheral velocities) of the tires 10 and 20 are detected respectively by rotation detectors 17 and 27 and the detection signals are input to the controller 30. The controller 30 calculates the body traveling speed (vehicle speed) based upon the detection signals provided from the rotation detectors 17 and 27 and controls the displacement control devices 11a and 21a as detailed later based upon the vehicle speed.

The hydraulic pump 1 is a variable-displacement pump, the pump displacement of which is controlled by a displacement control device 1a. The displacement control device 1a includes a displacement cylinder and a forward/reverse switching valve, which is switched by interlocking with an operation of a forward/reverse switching lever (not shown). As the forward/reverse switching lever is operated to a neutral (stop) position, the forward/reverse switching valve is switched to the neutral position and the displacement cylinder is controlled to disallow any displacement of the hydraulic pump 1 and thus set the pump output quantity to 0.

As the forward/reverse switching lever is operated to a forward position or a reverse position, the forward/reverse switching valve is switched to the forward position or the reverse position accordingly and the direction along which the displacement cylinder operates is controlled so as to control the displacement direction of the hydraulic pump 1. At this time, a control pressure is supplied to the displacement cylinder via the forward/reverse switching valve and the pump displacement quantity is controlled based upon the control pressure. The control pressure increases in proportion to an increase in the engine rotation speed and, as the control pressure rises, the pump displacement quantity, too, increases. In other words, an increase in the engine rotation speed results in increases in both the rotation speed of the hydraulic pump 1 and the pump displacement quantity, which allows the pump output quantity to increase smoothly in quick response to the increase in the engine rotation speed so as to achieve smooth and powerful acceleration. It is to be noted that the engine rotation speed is adjusted through an operation of an accelerator pedal (not shown).

Figure 3:
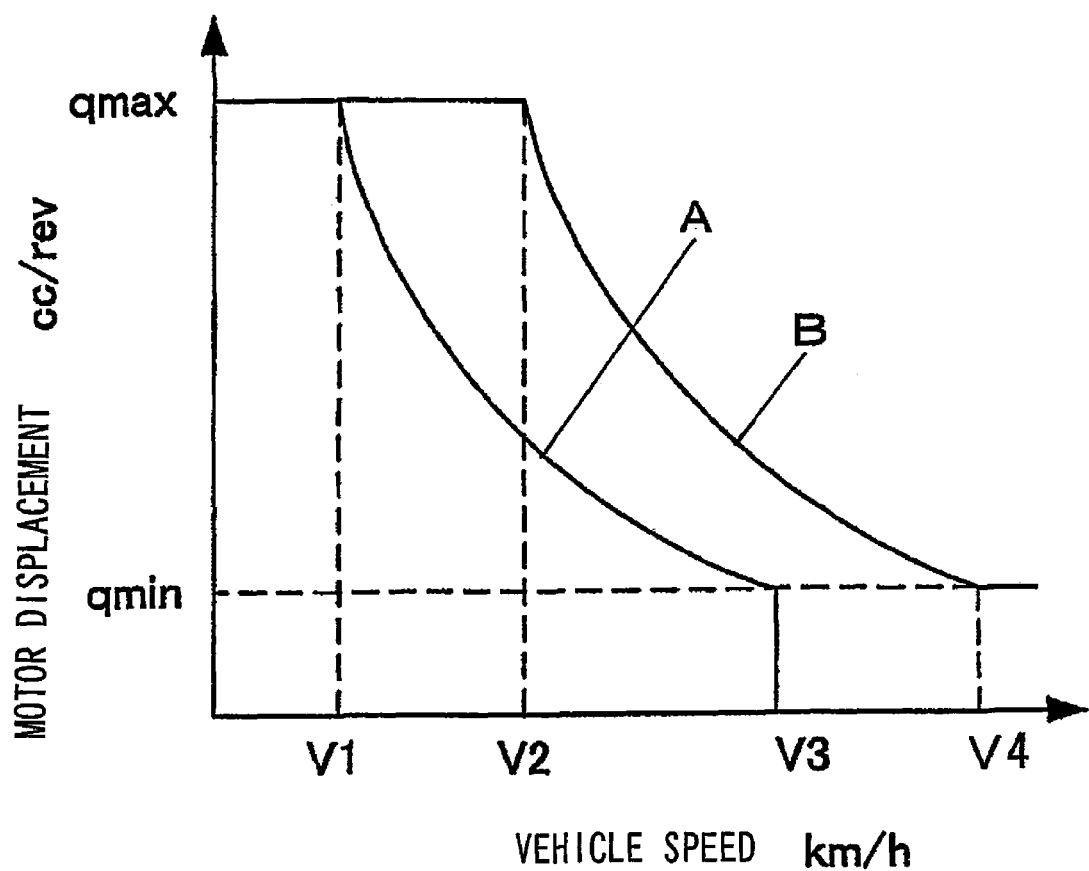
FIG. 3 presents an example of displacement control characteristics that may be assumed by hydraulic motors in FIG. 2.

FIG. 3 presents an example of displacement control characteristics that may be assumed by the hydraulic motors 11 and 21, with the vehicle speed indicated along the horizontal axis and the motor displacement indicated along the vertical axis. In the figure, A represents the control characteristics of the hydraulic motor 11 for driving the front wheels and B represents the control characteristics of the hydraulic motor 21 for driving the rear wheels. These characteristics A and B are stored in advance in the controller 30 and the motor displacements of the individual hydraulic motors 11 and 20 are controlled based upon the stored characteristics.

The characteristics curve A indicates that the motor displacement is sustained at a maximum level $q_{max}$ as long as the vehicle speed is equal to or less than V1, that the motor displacement gradually decreases as the vehicle speed picks up once the vehicle speed exceeds V1 and that the motor displacement drops from the minimum level $q_{min}$ to 0 as the vehicle speed reaches V3. The characteristics curve B indicates that the motor displacement is sustained at the maximum level $q_{max}$ as long as the vehicle speed is equal to or less than V2 (V1<V2<V3), that the motor displacement gradually decreases as the vehicle speed picks up after the vehicle speed exceeds V2 and that the motor displacement is reduced to the minimum level qmin when the vehicle speed is equal to or higher than V4 (>V3).

Figure 4:
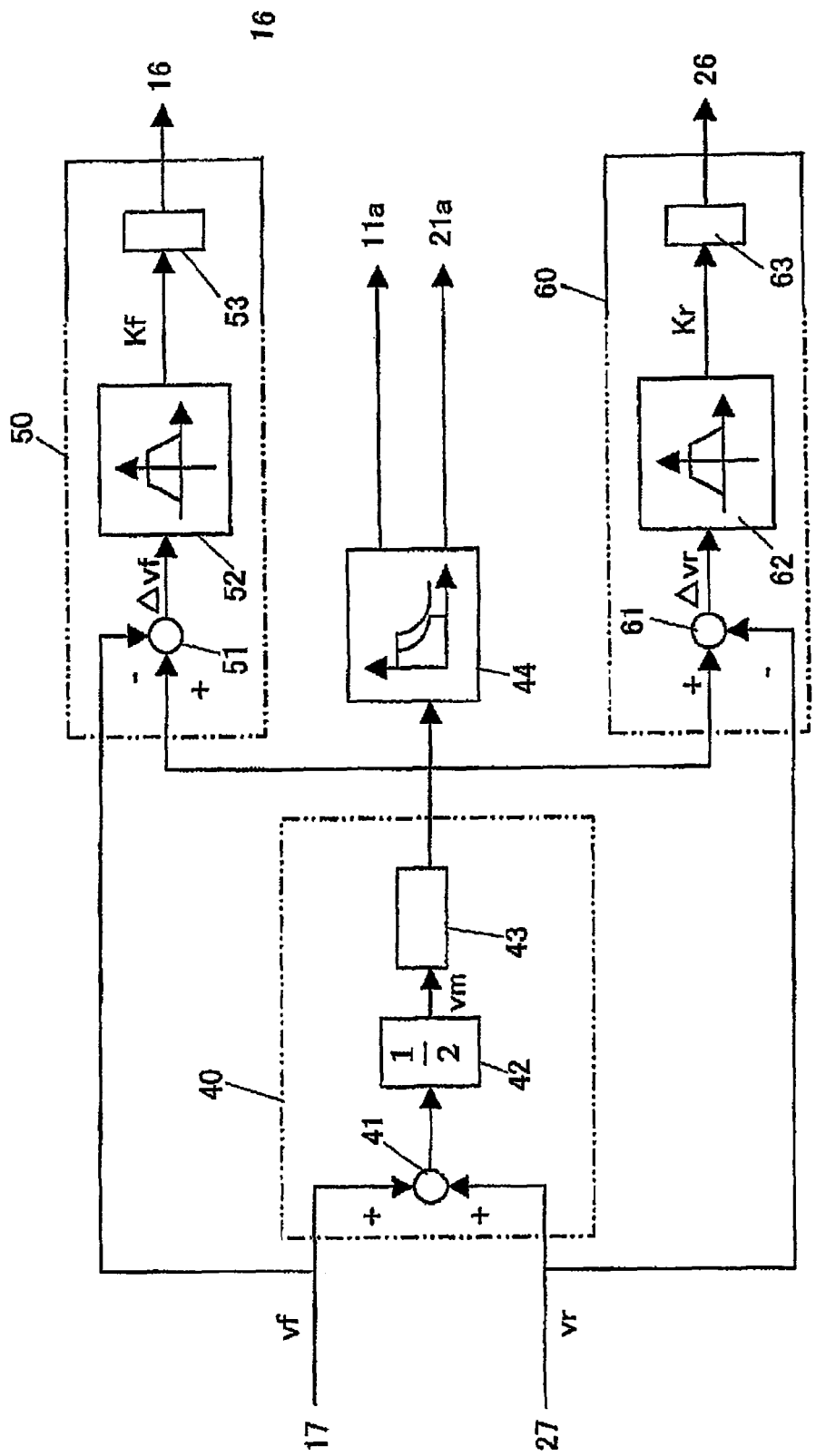
FIG. 4 is a block diagram showing the structure adopted in the travel control device in the first embodiment.

FIG. 4 is a block diagram illustrating the processing executed by the controller 30 in the first embodiment. A vehicle speed detector 40 calculates the vehicle speed (estimated vehicle speed) based upon the signals provided from the rotation detectors 17 and 27. In this example, the rotational velocities vf and vr of the front and rear wheels detected by the rotation detectors 17 and 27 respectively are added together at an adder 41, the average of the two rotational velocities (vf+vr)/2 is calculated at an average value calculation circuit 42 and then the average value having been calculated undergoes low pass filter processing at a filter processing circuit 43 so as to remove response at frequencies equal to or greater than an estimated body response frequency (noise removal). The estimated vehicle speed vm thus obtained is used for substitution in a displacement calculation circuit 44 having the characteristics shown in FIG. 3 stored therein so as to determine through arithmetic operation a target motor displacement and control signals are output to the displacement control devices 11a and 21a to adjust the motor displacements to the target motor displacement.

Flow control circuits 50 and 60 respectively control the electromagnetic switching valves 16 and 26 in correspondence to deviations $\Delta vf$ and $\Delta vr$ of the rotational velocities vf and vr at the front and rear wheels relative to the estimated vehicle speed vm. At this time, subtractors 51 and 61 respectively subtract the rotational velocities vf and vr at the front and rear wheels detected by the rotation detectors 17 and 27 from the estimated vehicle speed vm, thereby determining the speed deviations $\Delta vf$ (=vm−vf) and $\Delta vr$ (=vm−vr). As long as the tires 10 and 20 do not slip, the speed deviations $\Delta vf$ and $\Delta vr$ both remain at 0. However, if a tire slips, the corresponding speed deviation $\Delta vf$ or $\Delta vr$ (the absolute value of the speed deviation) assumes a greater value in correspondence to the extent of slippage (slip quantity). In other words, the extent of slippage can be detected by checking the speed deviations $\Delta vf$ and $\Delta vr$. It is to be noted that if a front tire 10 slips while the vehicle is accelerating, vf becomes greater than vm and, accordingly, $\Delta vf<0$ is true. If, on the other hand, a front tire 10 slips while the vehicle is decelerating, vf becomes less than vm and accordingly, $\Delta vf>0$ is true.

Coefficient generating circuits 52 and 62 respectively calculate coefficients Kf and Kr corresponding to the speed deviations $\Delta vf$ and $\Delta vr$ based upon characteristics (see FIGS. 5(a) and 5(b)) stored in advance. Multipliers 53 and 63 respectively multiply maximum restriction diameters (constants) of the flow control valves 16 and 26 stored in advance by the coefficients Kf and Kr so as to determine target restriction diameters. Control signals are then output to the electromagnetic switching valves 16 and 26 so as to adjust the restriction diameters at the flow control valves 15 and 26 to the respective target restriction diameters.

FIGS. 5(a) and 5(b) respectively show the characteristics stored in the coefficient generating circuits 52 and 62. The characteristics in FIG. 5(a) indicate that when the value (absolute value) of the speed deviation $\Delta vf$ is less than a predetermined value vf1 ($-vf1<\Delta vf<vf1$) the coefficient Kf assumes a value of 1, that when the value of the speed deviation $\Delta vf$ is equal to or greater than the predetermined value vf1 and equal to or less than a predetermined value vf2, the coefficient Kf gradually decreases from 1 to 0 as the speed deviation $\Delta vf$ increases and that the coefficient Kf assumes the value of 0 if the speed deviation $\Delta vf$ is greater than the predetermined value vf2 ($\Delta vf<-vf2, \Delta vf>vf2$). Likewise, the characteristics in FIG. 5(b) indicate that when the value (absolute value) of the speed deviation $\Delta vr$ is less than a predetermined value vr1 ($-vr1<\Delta vr<vr1$) the coefficient Kr assumes a value of 1, that when the value of the speed deviation $\Delta vr$ is equal to or greater than the predetermined value vr1 and equal to or less than a predetermined value vr2, the coefficient Kr gradually decreases from 1 to 0 as the speed deviation $\Delta vr$ increases and that the coefficient Kr assumes the value of 0 if the speed deviation $\Delta vr$ is greater than the predetermined value vr2 ($\Delta vr<-vr2, \Delta vr>vr2$). Thus, if the extents of slip at the tires 10 and 20 are small, the flow control valves 15 and 25 assume greater restriction diameters but if the extents of slip are significant, the restriction diameters become smaller.

Next, the primary operations of the travel control device achieved in the first embodiment are explained.

At the start of a vehicle traveling operation, the forward/reverse operation lever (not shown) is switched from the neutral position to the forward position and the accelerator pedal (not shown) is depressed. In response, the engine rotation speed rises and the quantity of output from the hydraulic pump 1 increases. At this point, the displacement quantities of the hydraulic motors 11 and 21 are both at the maximum qmax level and the vehicle thus starts traveling in a high torque four-wheel-drive state. As the vehicle speed (estimated speed) rises, the motor displacements decrease, as indicated by the characteristics curves in FIG. 3. During this process, the motor displacement of the hydraulic motor 11 decreases ahead of the motor displacement of the hydraulic motor 21 and as the vehicle speed becomes equal to or greater than the predetermined value V3, the motor displacement of the hydraulic motor 11 is set to 0 and the vehicle enters a two wheel drive (rear wheel drive) state. By controlling the motor displacements in correspondence to the vehicle speed as described above, the speed reduction ratio is controlled continuously, to assure smooth traveling performance.

Assuming that no slip has occurred at the front and rear tires 10 and 20, the deviations $\Delta vf$ and $\Delta vr$ of the rotational velocities vf and vr at the tires 10 and 20 relative to the estimated vehicle speed vm are both 0 and, accordingly, the coefficients Kf and Kr calculated at the coefficient generating circuits 52 and 62 assume a value of 1. As a result, the maximum restriction diameters are assumed at the flow control valves 16 and 26 and since the quantities of pressure oil supplied to the hydraulic motors 11 and 21 are not restricted via the flow control valves 15 and 25 in this state, the vehicle traveling performance as indicated by the characteristics curves in FIG. 3 is achieved.

If, on the other hand, a rear tire 20 slips (if slippage occurs) as the accelerator pedal is depressed (as the vehicle accelerates) the rotational velocity vr of the tire 20 becomes greater than the estimated vehicle speed vm and thus, the speed deviation $\Delta vr$ becomes less than 0. In this situation, the speed deviation $\Delta vr$ (absolute value) assumes a greater value if the extent of slippage of the tire 20 is greater. When $\Delta vr$ is equal to or greater than the predetermined value vr1 ($\Delta vr\leq-vr1, \Delta vr>vr1$), the coefficient Kr assumes a value smaller than 1. As $\Delta vr1$ is equal to or greater than the predetermined value vr2 ($\Delta vr<-vr2, \Delta vr>vr2$), the coefficient Kr assumes the value of 0.

The restriction diameter at the flow control valve 25 gradually decreases as the extent of slippage increases and thus, the quantity of oil supplied to the hydraulic motor 21 is restricted. As a result, the rotational velocity of the rear wheels is lowered so as to minimize the extent of slippage at the tire 20. Consequently, the drive pressure oil from the hydraulic pump 1 can be distributed to the front and the rear wheels efficiently and since the drive force at the front wheels can be transmitted to the road surface reliably, desirable traveling performance is assured.

If a rear tire 20 slips (e.g., if a tire 20 becomes locked) while a brake pedal is operated (while the vehicle is decelerating), the deviation Δvr becomes greater than 0 and the coefficient Kr assumes a value less than 1. This reduces the restriction diameter at the flow control valve 25 and the quantity of pressure oil supplied to the hydraulic motor 21 becomes restricted. As a result, the braking force needed to stop the vehicle (the braking force applied to the brake device) is reduced to minimize the extent of slippage and the drive pressure oil from the hydraulic pump 1 can thus be distributed to the front and rear wheels efficiently. While an explanation is given above on the operations executed when a rear tire 20 slips, similar operations are executed in the event of a front tire slip.

In the first embodiment, a single hydraulic pump 1 is connected through a closed circuit connection to two hydraulic motors 11 and 21 disposed parallel to each other so as to drive the front wheels and the rear wheels via the different hydraulic motors 11 and 21. As a result, differential drive of the front wheels and the rear wheels is enabled so as to allow the vehicle to travel smoothly around a corner by absorbing the difference between the loci of the front wheel and the rear wheel (the difference between the loci of the inner wheels). In addition, any occurrence of slippage is detected by checking the deviations Δvf and Δvr of the rotational velocities vf and vr of the tires 10 and 20 relative to the estimated vehicle speed vm and if a slip occurs, the corresponding flow control valve 15 or 25 is constricted to reduce the quantity of pressure oil supplied to the hydraulic motor 11 or 21. As a result, the rotational velocity of the slipping tire 10 or 20 is reduced to effectively minimize the extent of slip. This, in turn, allows the drive pressure oil to be distributed to the individual hydraulic motors 11 and 21 efficiently. Since the quantity of pressure oil supplied to the hydraulic motor 11 or 21 is reduced to a greater extent if the extent of the slip is more significant, the slip can be eliminated promptly. Since the vehicle speed vm is estimated by utilizing the rotation detectors 17 and 27, which detect the rotational velocities vf and vr of the tires 10 and 20 and then the deviations Δvf and Δvr of the rotational velocities vf and vr-relative to the vehicle speed vm are determined, slip detection can be enabled while requiring a minimum member of sensors.

-Second Embodiment-

Figure 6:
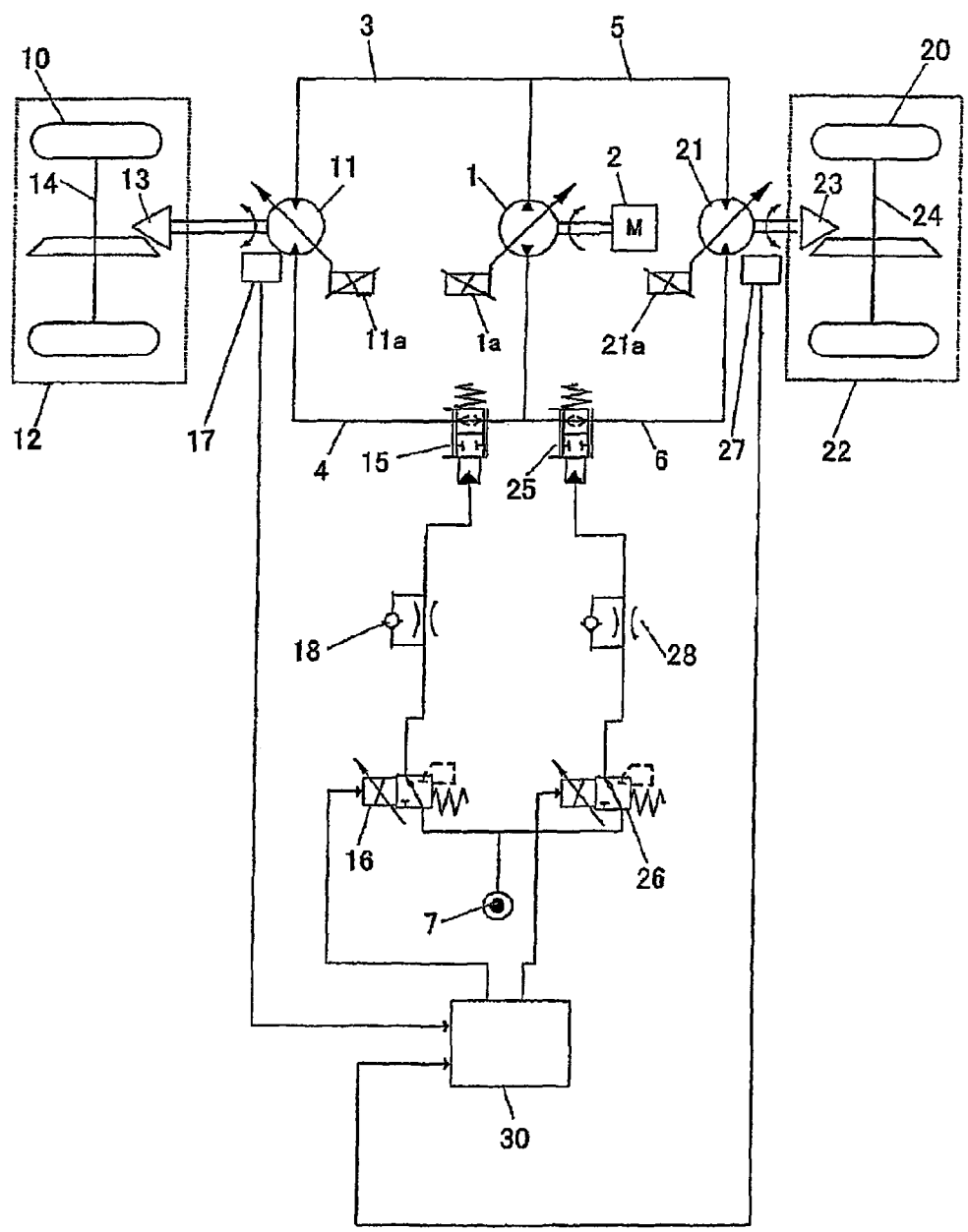
FIG. 6 is a traveling hydraulic circuit diagram illustrating the structure adopted in the travel control device achieved in a second embodiment.

The second embodiment of the travel control device according to the present invention is now explained in reference to FIG. 6.

In the second embodiment, the restriction diameters at the flow control valves 15 and 25 assume dynamic characteristics. Namely, the flow control valves 15 and 25 each assume characteristics such that the restriction diameter is promptly reduced in the event of a slip and the restriction diameter is then slowly increased once the slip is eliminated. It is to be noted that the following explanation focuses on the difference from the first embodiment. FIG. 6 is a traveling hydraulic circuit diagram of the traveling hydraulic circuit of the work vehicle achieved in the second embodiment. In the figure, the same reference numerals are assigned to components identical to those in FIG. 2.

As shown in FIG. 6, slow return valves 18 and 28 are disposed respectively between the electromagnetic switching valve 16 and the flow control valve 15 and between the electromagnetic switching valve 26 and the flow control valve 25. Thus, as soon as a slip starts to occur at a tire 10 or 20, the pilot pressure oil from the hydraulic source 7 is immediately supplied to the corresponding flow control valve 15 or 25, which immediately constricts the flow control valve 15 or 25. Consequently, the drive force applied to the slipping tire 10 or 20 decreases quickly so as to eliminate the slippage. Once the slip is eliminated, the pilot pressure oil having been applied to the flow control valve 15 or 25 is caused to flow back slowly via the corresponding slow return valve 18 or 28. As a result, a slip does not occur readily as the flow control valve 15 or 25 is reset to the initial state so as to prevent recurrence of a slip. It is to be noted that the slip-free state can be detected in much the same way as the detection of the slipping state, based on the deviations Δvf and Δvr of the rotational velocities vf and vr at the tires 10 and 20 relative to the estimated vehicle speed vm.

-Third Embodiment-

Figure 7:
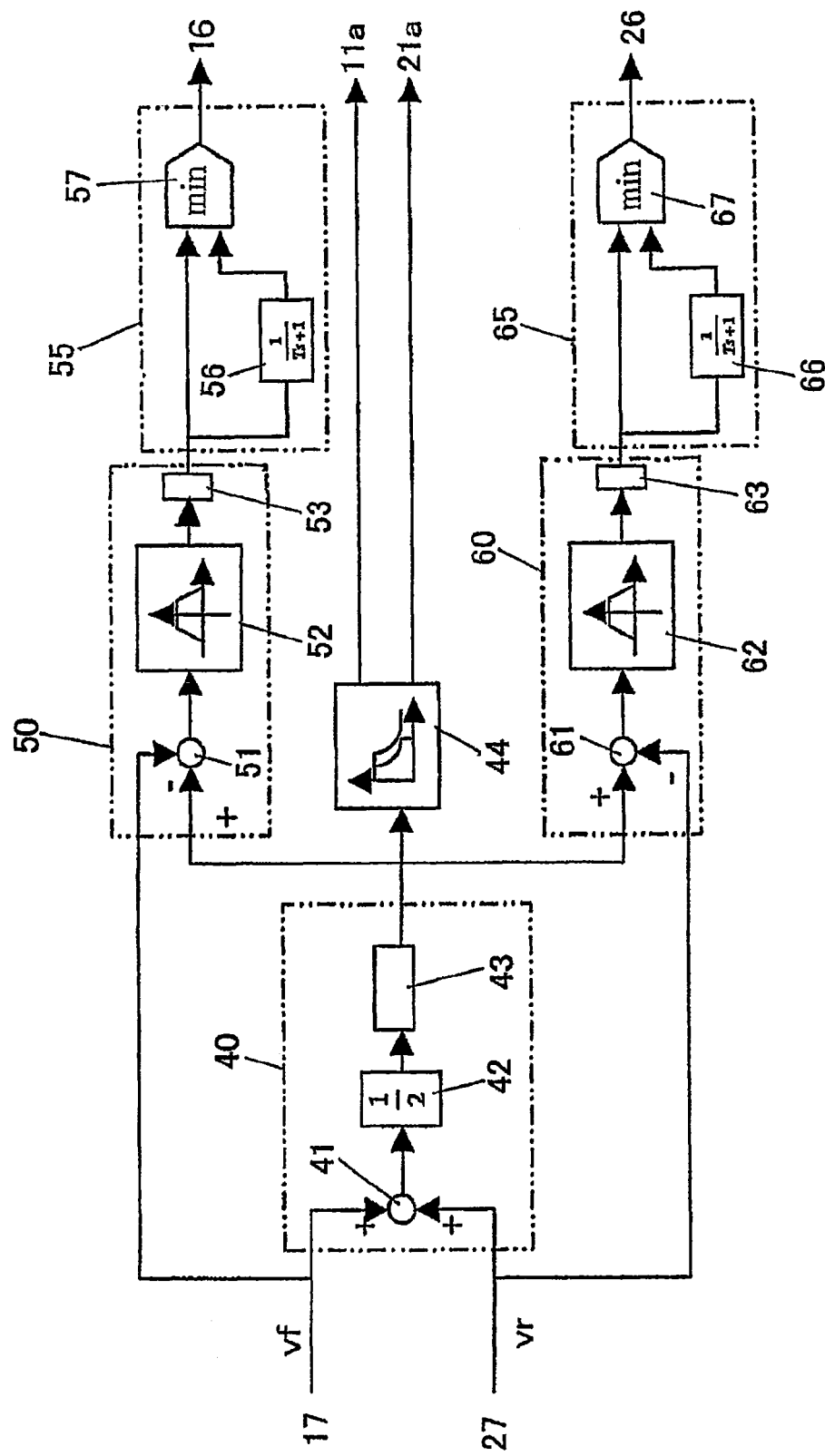
FIG. 7 is a block diagram showing the structure adopted in the travel control device in a third embodiment.
Figure 8:
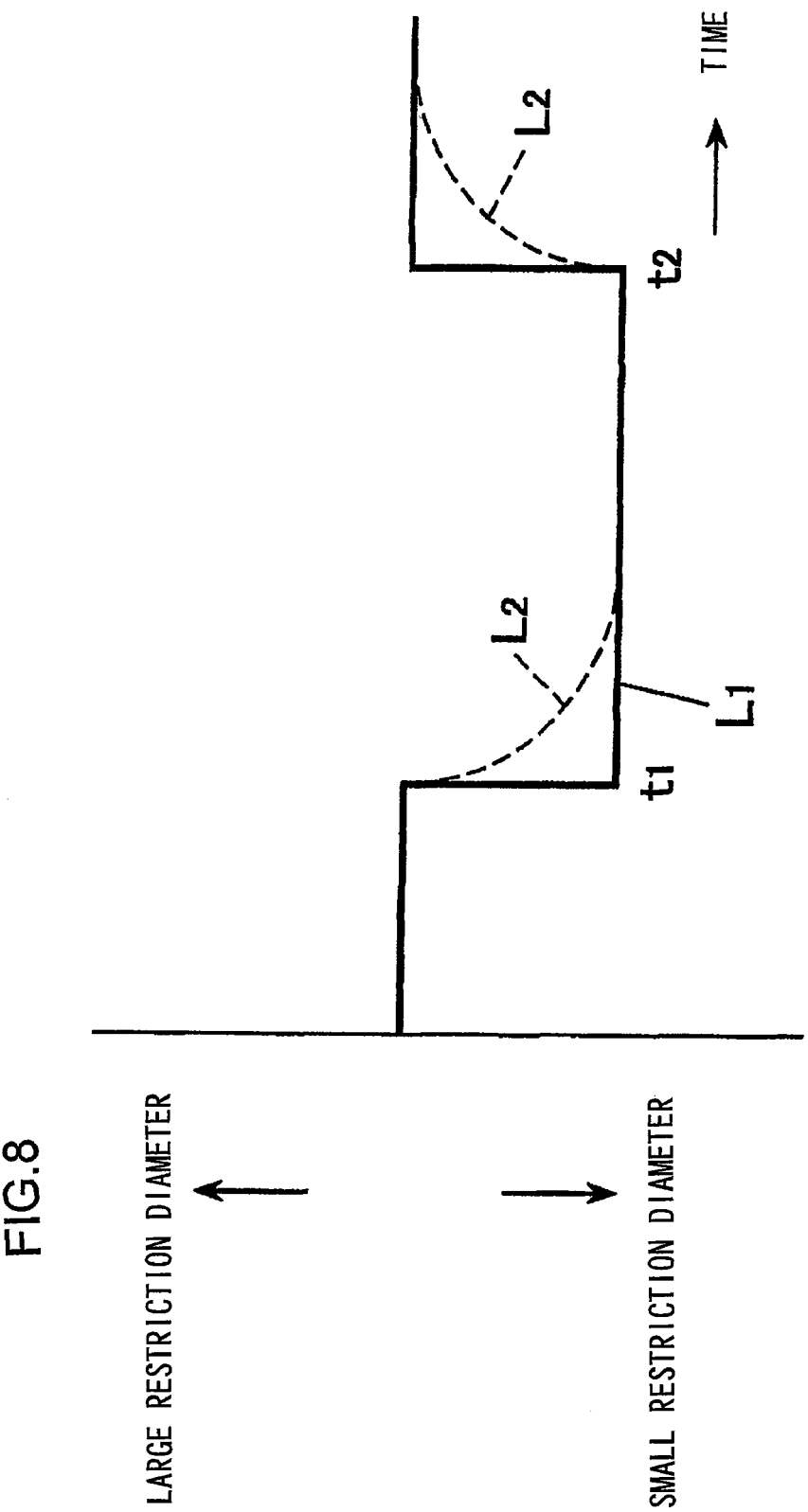
FIG. 8 shows the operational characteristics of the travel control device achieved in the third embodiment.

In reference to FIGS. 7 and 8, the third embodiment of the travel control device according to the present invention is explained.

While the restriction diameters at the flow control valves 15 and 25 are reduced promptly and increased slowly via the slow return valves 18 and 28 in the second embodiment, similar restriction diameter control is achieved through processing executed by the controller 30 in the third embodiment. The following explanation focuses on the difference from the first embodiment. FIG. 7 is a block diagram illustrating the processing executed by the controller 30 in the third embodiment. In the figure, the same reference numerals are assigned to components identical to those in FIG. 4.

As shown in FIG. 7, control signals obtained through arithmetic operations executed in the flow control circuits 50 and 60 first undergo processing at delay processing circuits 55 and 65 respectively before they are output to the electromagnetic switching valve 16 and 26. The delay processing circuits 55 and 65 respectively include retardation processing circuits 56 and 66, which execute first-order lag processing on the signals (indicating the target restriction diameters) provided by the coefficient generating circuits 53 and 63 and minimum value selection circuits 57 and 67, which select either the signals provided from the coefficient generating circuits 53 and 63 or the signals provided by the retardation processing circuits 56 and 66, whichever indicate smaller values.

Operations are executed as follows in the third embodiment. Assuming that a tire 10 slips at a time t1 in FIG. 8 and that the slip is eliminated at a time t2, the coefficient generating circuit 53 outputs a signal that will reduce the restriction diameter at the time t1 and outputs a signal that will reset the restriction diameter to the initial setting at the time t2, as indicated by the characteristics curve L1 (the solid line). During this process, the retardation processing circuit 56 outputs a first-order lag signal such as that indicated by the characteristics curve L2 (the dotted line). The minimum value selection circuit 57 thus selects the characteristics L1 at the start of the slip and selects the characteristics L2 once the slip is eliminated. As described above, the structure adopted in the embodiment allows the restriction diameters at the flow control valves 15 and 25 to be reduced quickly and increased slowly. As a result, slipping of the tires 10 and 20 can be eliminated promptly and also, recurrence of slipping that may otherwise manifest readily as the restriction diameters at the flow control valves 15 and 25 are reset to the initial settings can be effectively prevented.

-Fourth Embodiment-

Figure 9:
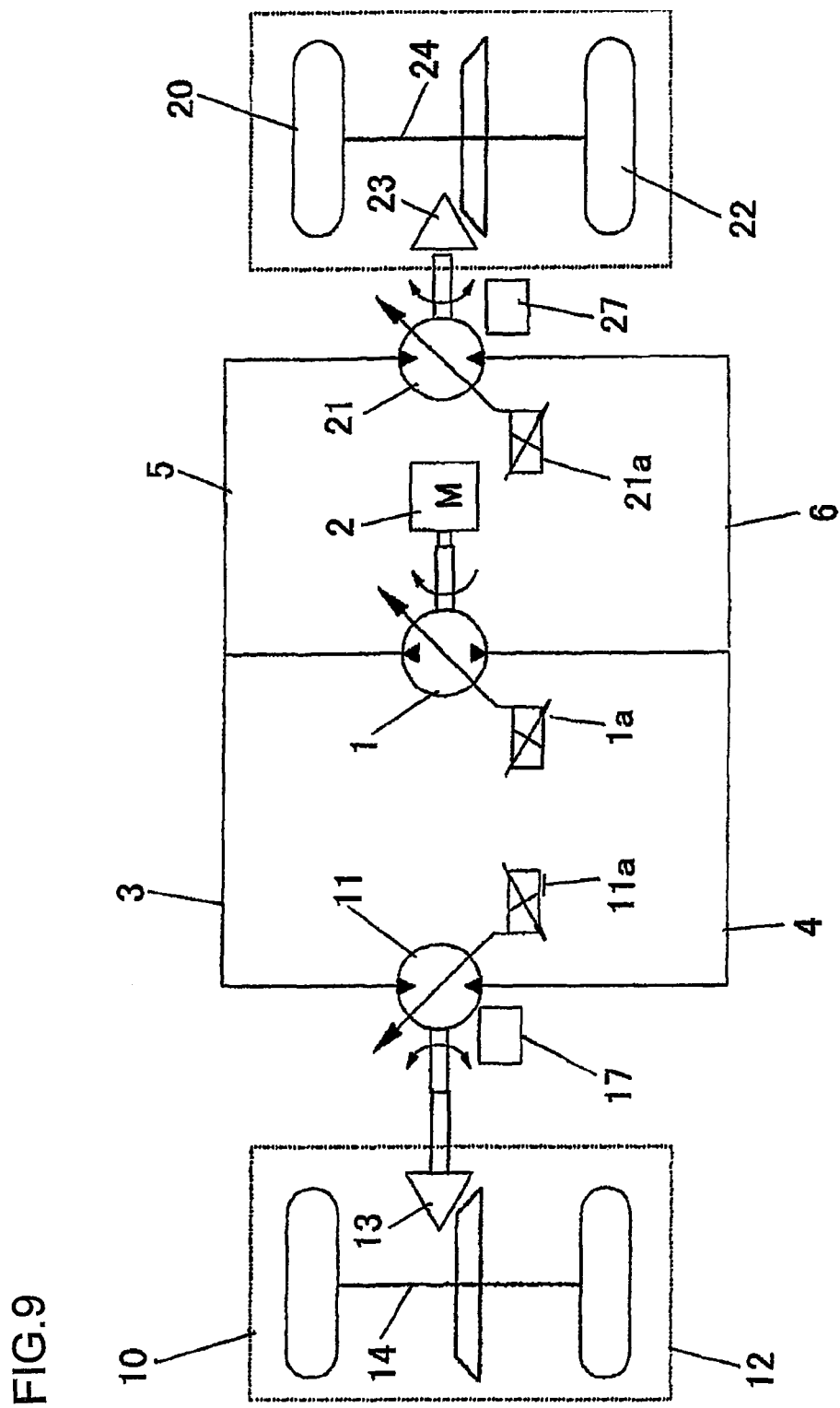
FIG. 9 is a traveling hydraulic circuit diagram illustrating the structure adopted in the travel control device achieved in a fourth embodiment.
Figure 10:
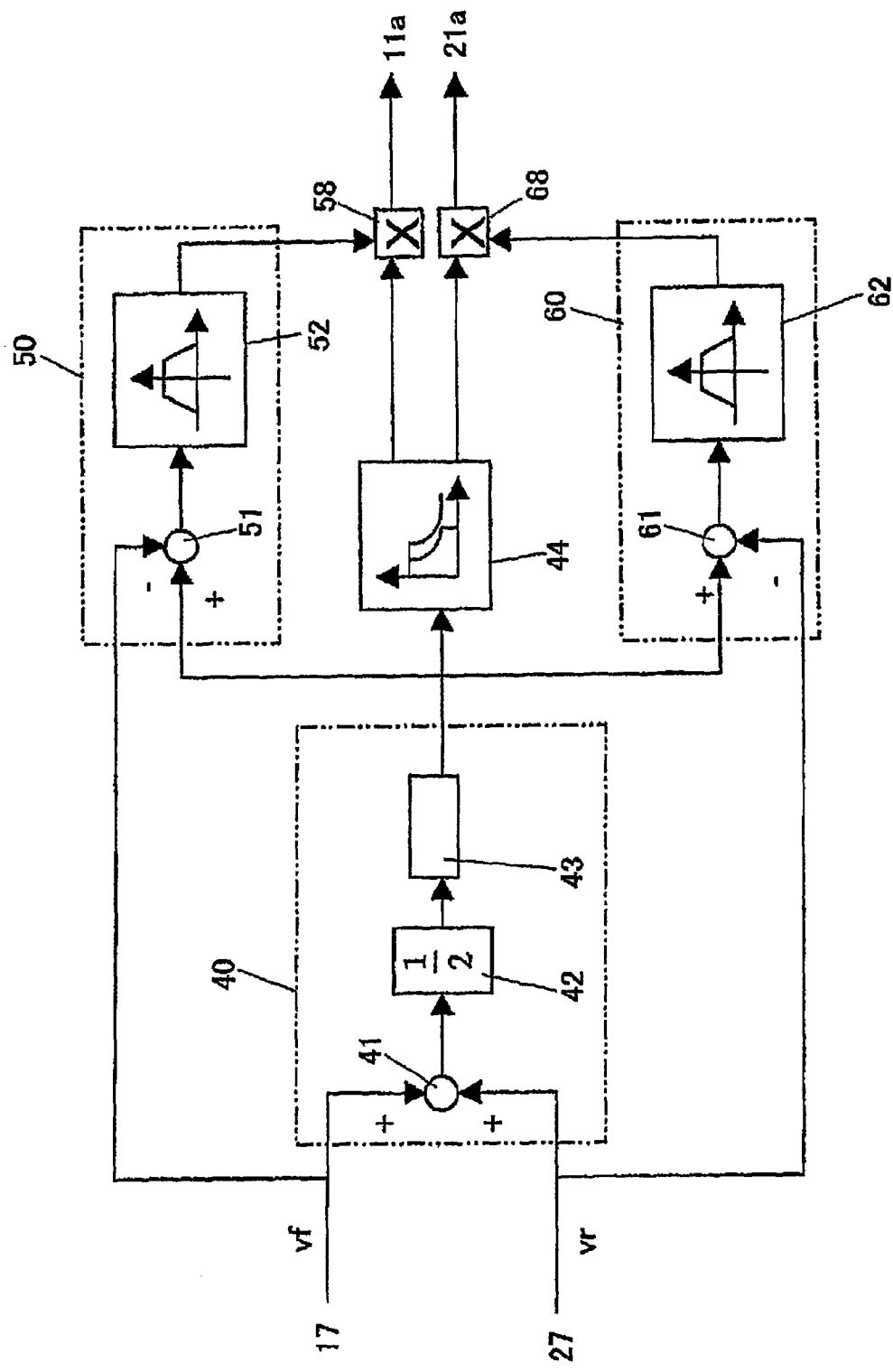
FIG. 10 is a block diagram showing the structure adopted in the travel control device in the fourth embodiment.

In reference to FIGS. 10 and 9, the fourth embodiment of the travel control device according to the present invention is explained.

While the extent of slippage is minimized by controlling the flow control valves 15 and 25 in the first through third embodiments, the extent of slippage is minimized by controlling the motor displacements at the hydraulic motors 11 and 25 in the fourth embodiment. It is to be noted that the following explanation focuses on the difference from the first embodiment. FIG. 9 is a traveling hydraulic circuit diagram of the traveling hydraulic circuit of the work vehicle achieved in the fourth embodiment. In the figure, the same reference numerals are assigned to components identical to those in FIG. 2.

As shown in FIG. 9, the flow control valves 15 and 25 are not disposed in the pipelines 4 and 6 in the fourth embodiment. The controller 30 (not shown in FIG. 9) executes the following processing based upon signals provided from the rotation detectors 17 and 27 to control the displacement control devices 11a and 21a.

FIG. 10 is a block diagrams illustrating the processing executed by the controller 30 in the fourth embodiment. In the figure, the same reference numerals are assigned to components identical to those in FIG. 4. As shown in FIG. 10, the motor displacements of the hydraulic motors 11 and 21, calculated in the displacement calculation circuit 44, are respectively input to multipliers 58 and 68. The multipliers 58 and 68 respectively multiply the motor displacements by the coefficients Kf and Kr having been determined through arithmetic operations executed at the coefficient generating circuits 52 and 62, thereby determining the target motor displacements. Control signals are then output to the displacement control devices 11a and 21a so as to adjust the motor displacements to the target motor displacements.

In the fourth embodiment, the multipliers 58 and 68 multiply the motor displacements respectively by the coefficient Kf set to 1 and the coefficient Kr set to 1 and thus, the motor displacements calculated at the displacement calculation circuit 44 are directly used as the target motor displacements, as long as no slip occurs at the tires 10 and 20. If, on the other hand, a slip occurs at a front tire 10, the motor displacement calculated by the displacement calculation circuit 44 is multiplied by the coefficient Kf assuming a value less than 1, resulting in a smaller target motor displacement. As a result, the drive torque applied to the tires 10 is reduced so as to minimize the extent of slippage occurring between the tires and the road surface.

As described above, if a tire 10 or 20 slips, the motor displacement of the hydraulic motor 11 or 21 driving the slipping tire is reduced so as to minimize the extent of the slip by reducing the drive torque in the fourth embodiment. In addition, since the flow control valves 15 and 25 do not need to be disposed in the pipelines 4 and 6, a simpler structure requiring a smaller number of parts is achieved.

Figure 11:
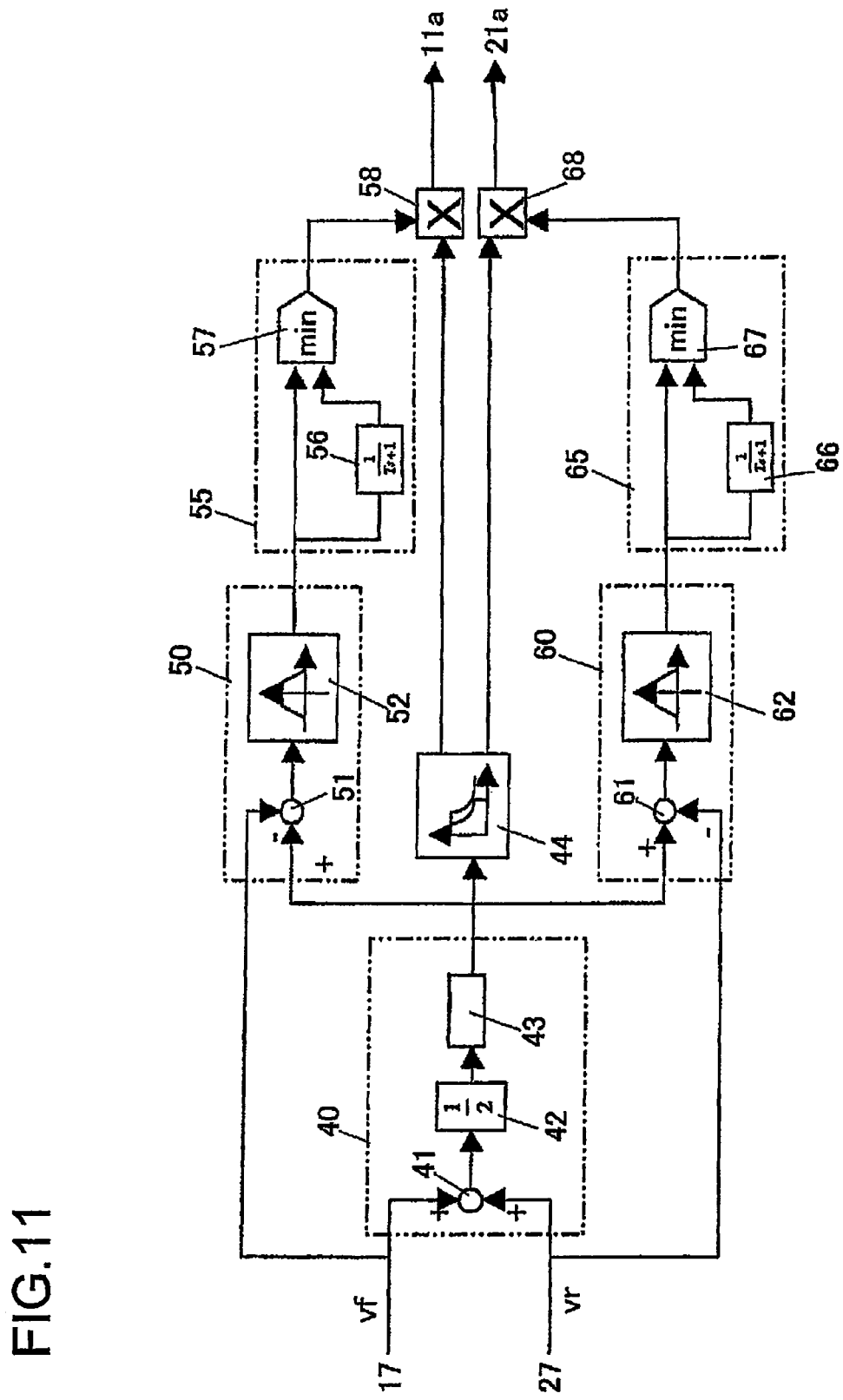
FIG. 11 presents an example of a variation of FIG. 10.

It is to be noted that instead of outputting the coefficients Kf and Kr calculated at the coefficient generating circuits 52 and 62 directly to the multipliers 58 and 68, the coefficients Kf and Kr may be output to the respective multipliers 58 and 68 via the delay processing circuits 55 and 65 described in reference to the third embodiment, as shown in FIG. 11. In this case, the motor displacement decreases promptly in the event of a slip and the motor displacement then increases slowly as the slip is eliminated. In other words, the slip is controlled quickly and a recurrence of the slip while restoring the motor displacement is prevented effectively.

It is to be noted that while any slippage of the tires 10 and 20 is detected by the rotation detectors 17 and 27 constituting a speed detection means, a slip detection means other than those may be utilized. For instance, a vehicle speed sensor, which is independent of the rotation detectors 17 and 27, may be utilized to detect a vehicle speed and a slip may be detected by calculating the deviations of the rotational velocities detected by the rotation detectors 17 and 27 relative to the detected vehicle speed. While the quantity of pressure oil supplied to the hydraulic motor 11 or 21 or the motor displacement of the hydraulic motor 11 or 21 is gradually restored via the slow return valve 18 or 28 or the delay processing circuits 55 or 65 when the slip is eliminated, a restoring means other than those may be utilized.

While the quantities of pressure oil supplied to the hydraulic motors 11 and 21 are reduced via the electromagnetic switching valves 16 and 26 and the flow control valves 15 and 25, any flow control means other than those may be utilized as long as the quantity of pressure oil supplied to the hydraulic motor 11 or 21 driving a slipping tire 10 or 20 is reduced upon detecting a slip of the tire 10 or 20. In addition, while the motor displacements are reduced by the displacement control devices 11a and 21a, any displacement control means other than those may be utilized as long as the motor displacement of the hydraulic motor 11 or 21 driving a slipping tire 10 or 20 is reduced upon detecting a slip of the tire 10 or 20. This means that the controller 30 may execute processing other than that described earlier.

While the present invention is adopted in a telescopic handler in the embodiments described above, the present invention may be adopted equally effectively in another type of work vehicle (e.g., wheel loaders and wheel hydraulic excavators) as long as the work vehicle is engaged in traveling operation via the hydraulic motors 11 and 21 connected to the hydraulic pump 1 through a closed-circuit connection. Namely, as long as the features and functions of the present invention are realized, the present invention may be embodied in a travel control device other than those described in reference to the embodiments. It is to be noted that the embodiments described above simply represent examples and that the present invention may be interpreted without being in any way restricted by the correspondence between the description of the embodiments and the description in the scope of patent claims.

The disclosure of the following priority application is herein incorporated by reference:

Japanese Patent Application No. 2005-319362 filed Nov. 2, 2005

The invention claimed is:

1. A travel control device for a work vehicle, comprising:
a hydraulic pump;
a hydraulic motor for driving front wheels and a hydraulic motor for driving rear wheels with pressure oil delivered from the hydraulic pump, connected to the hydraulic pump in parallel through a closed-circuit connection;
a slip detection device that detects a slip occurring at any of the front wheels and the rear wheels; and
a displacement reducing device that reduces, upon detection of a slip occurring at any of the front wheels and the rear wheels by the slip detection device, a motor displacement of a hydraulic motor for driving the wheel at which the slip has been detected, among the hydraulic motor for driving the front wheels and the hydraulic motor for driving the rear wheels;
wherein the displacement reducing device quickly reduces the motor displacement of the hydraulic motor upon the detection of a slip by the slip detection device and gradually restores the motor displacement of the hydraulic motor to a value before reduction as the slip detection device determines that a slip is eliminated.

2. A travel control device for a work vehicle according to claim 1, wherein:

the displacement reducing device reduces the motor displacement of the hydraulic motor by a greater extent as an extent of slippage detected by the slip detection device becomes larger.

3. A travel control device for a work vehicle according to claim 1, wherein:
the slip detection device comprises a speed detection device that detects a rotational velocity at each of the front wheels and the rear wheels, estimates a vehicle speed based upon the rotational velocities detected by the speed detection device and detects a slip based upon deviations of the rotational velocities detected by the speed detection device relative to the estimated vehicle speed.

4. A work vehicle comprising:
a travel control device for a work vehicle according to claim 1.

5. A travel control device for a work vehicle according to claim 2, wherein:
the slip detection device comprises a speed detection device that detects a rotational velocity at each of the front wheels and the rear wheels, estimates a vehicle speed based upon the rotational velocities detected by the speed detection device and detects a slip based upon deviations of the rotational velocities detected by the speed detection device relative to the estimated vehicle speed.

6. A travel control device for a work vehicle according to claim 1, wherein:
the slip detection device comprises a speed detection device that detects a rotational velocity at each of the front wheels and the rear wheels, estimates a vehicle speed based upon the rotational velocities detected by the speed detection device and detects a slip based upon deviations of the rotational velocities detected by the speed detection device relative to the estimated vehicle speed.

7. A travel control device for a work vehicle according to claim 1, wherein:
the displacement reducing device comprises:
an adjustment signal generating circuit that generates an adjustment signal to adjust a motor displacement control signal for the hydraulic motor such that the motor displacement of the hydraulic motor is reduced and the motor displacement of the hydraulic motor is restored to the value before the reduction;
a delay processing circuit that executes delay processing on the adjustment signal; and
a selection circuit that selects the adjustment signal that has not been subjected to the delay processing by the delay processing circuit when the motor displacement of the hydraulic motor is reduced, and selects the adjustment signal that has been subjected to the delay processing by the delay processing circuit when the motor displacement of the hydraulic motor is restored to the value before the reduction.

* * * * *